United States Patent [19]
Sasaki

[11] 3,756,351
[45] Sept. 4, 1973

[54] WEIGHT SCREW ROD TYPE DAMPER

[75] Inventor: Shoji Sasaki, Kawasaki-shi, Kanagawa-ken, Japan

[73] Assignee: Sanwa Tetsuki Kougiyou Kabushiki Kaisha, Tokyo, Japan

[22] Filed: Dec. 7, 1971

[21] Appl. No.: 205,508

[30] Foreign Application Priority Data
July 15, 1971 Japan.............................. 46/52134

[52] U.S. Cl. ................................ 188/1 B, 188/129
[51] Int. Cl................................................ B60t 7/10
[58] Field of Search ................... 188/1 R, 1 B, 2 R, 188/129

[56] References Cited
UNITED STATES PATENTS

| | | | |
|---|---|---|---|
| 2,471,857 | 5/1949 | Bleakney et al..................... | 188/1 B |
| 3,059,727 | 10/1962 | Fuchs.................................. | 188/1 B |
| 3,532,187 | 10/1970 | Herring.............................. | 188/2 R |

*Primary Examiner*—Duane A. Reger
*Attorney*—Holman & Stern

[57] ABSTRACT

A weight screw rod type damper in which a cylindrical main case is provided with a closure and a fixing part at one end, and a cylindrical auxiliary case provided with fixing part at one end, and a small diameter threaded hole at the other end is inserted into the main case to be free to move axially inward and outward. A screw rod engaged rotatably in the closure of the main case near the fixing part, threadably engages the small diameter hole of the auxiliary case near the middle part of the rod and rotatable clockwise and is counterclockwise with the relative movement of the auxiliary case outward and inward of the main case and a cylindrical weight is fixed directly or through an accelerating device to the screw rod or an extension thereof.

1 Claim, 3 Drawing Figures

PATENTED SEP 4 1973 3,756,351

WEIGHT SCREW ROD TYPE DAMPER

BACKGROUND OF THE INVENTION

This invention relates to a damper to be used in a piping system for a thermal power-plant or chemical plant so that a slow movement of a pipe by a temperature variation or the like may not be restricted but a quick vibration by an earthquake or wind pressure may be damped.

BRIEF DESCRIPTION OF THE DRAWINGS

An embodiment of the present invention shall be explained with reference to the drawings in which.

CYLINDRICAL DETAILED DESCRIPTION OF THE INVENTION

Figure 1:
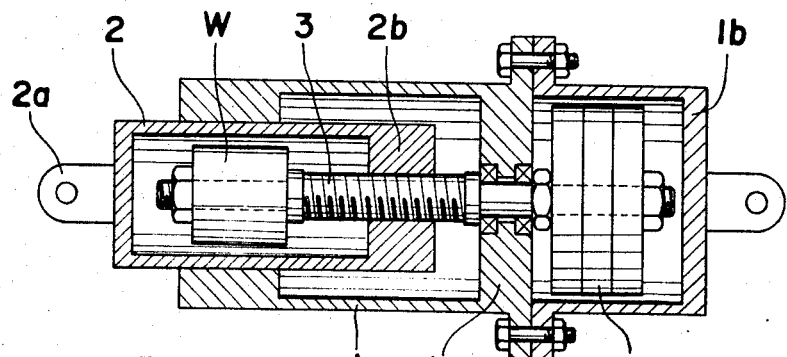
FIG. 1 is a view partly in cross section and partly in elevation of a damper.
Figure 2:
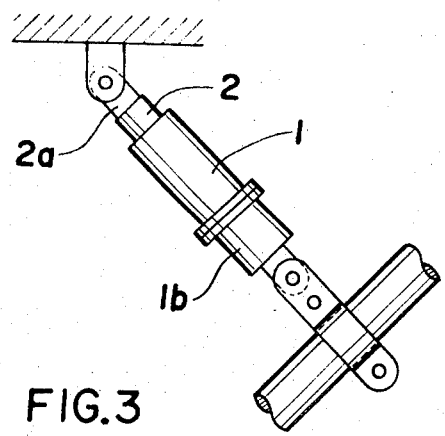
FIG. 2 is a diagrammatic view showing the damper as used.

A main cylindrical case (1) is provided with an open end closure (1a) at the other end with a cylindrical fixing part (1b) being fixed to the outside surface of the closure. An auxiliary case (2) which is also cylindrical, is provided with a fixing part (2a) at one end and a closure (2b) at the other end with the closure having a small diameter screw hole therein. The auxiliary case (2) is inserted within the main case via the open end so as to be free to move axially inward and outward thereof with the closure (2b) being opposed to the open end of the main case. In order to smooth the outward and upward movement relative to the main case, if necessary, a ball-bushing (not illustrated) may be provided between the main case and the auxiliary case. A screw rod (3) is rotatably engaged with the closure (1a) of the main case through thrust bearings near one end and is screwed into the screw of the closure (2b) of the auxiliary case (2) near the middle part thereof. This screwed part is so made that, with the relative movment of the auxiliary case inward or outward of the main case, the screw rod (3) may smoothly rotate clockwise or counter-clockwise. If necessary for this purpose, any known ball screw may be adopted in this screwed part. A cylindrical or disk-shaped weight (W) is fixed to a part of the screw rod (3) located within the cylindrical part (1b).

Figure 3:
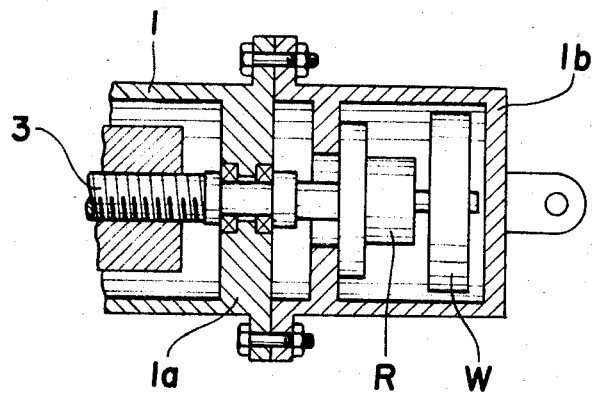
FIG. 3 is a fragmentary view partly in cross section and partly in elevation of a damper incorporating an accelerating device.

The present invention as above described is used with the fixing parts (1b) and (2a) connected respectively to a pipe (P) and a structure (S) as in shown FIG. (2). With the slow displacement of the pipe (P) by a temperature variation, the auxiliary case (2) will tend to slowly move relatively inward or outward of the main case and the screw rod having the weight (W) will be caused to rotate However, in case the pipe system is quickly vibrated by a cause such as an earthquake, the rotation of the rod will be braked by the inertia of the weight (W). If the inertia of the weight (W) is sufficient for the generated vibration, the screw rod will not rotate. In case the inertia of the weight is not sufficient, the screw rod will also rotate reciprocally. The reciprocal rotation is so minute as different from the vibration applied to this apparatus that there is little fear of damaging the pipe connected to the apparatus. In case the vibration applied to this apparatus is slow, there will be a fear that the screw rod will be caused to rotate. In case it is necessary to damp also the slow vibration, the diameter of the weight must be large so that the inertia of the weight will be large enough. In case it is difficult due to the restriction of the space, as in FIG. 3, an accelerating device (R) may be provided in the main case so that the rotation of the screw rod may be transmitted to the weight (W) through the accelerating device (R). Thus, a necessary operation can be made with a weight of a small diameter. It is also possible to adopt a known centrifugal brake drum instead of the above mentioned weight (W). In such case, when the rotating speed of the drum becomes high, the drum will be automatically braked to make the damping more positive.

Two types of spring and oil pressure dampers are already known. However, the spring type has a defect which will somewhat restrict also the slow movement of a pipe by a temperature variation or the like. The oil pressure type has a defect in that a periodical inspection and repair must be made. Neither of them is adapted to be used for a piping system required to be maintenance-free as is true of an atomic reactor, whereas the present invention is characterized in that no oil is used, since the device is complete a mechanical structure and the above mentioned defects can be eliminated.

What is claimed is:

1. A weight screw rod type damper comprising a cylindrical main case provided with a closure and a fixing part at one end and an open opposite end, a cylindrical auxiliary case provided with a fixing part at one end, and a closure at the opposite end having a small diameter threaded hole therein, said auxiliary case being inserted into the main case with its end closure facing the closure of the main case so as to be free to move axially inward and outward, a screw rod engaged rotatably in the closure of the main case, said screw rod threadably engaging the hole of the closure of the auxiliary case near the middle part thereof and being rotatable clockwise and counter-clockwise with the relative movment of the auxiliary case inward and outward of the main case and a cylindrical weight within the fixing part of the main case operably connected to the screw rod whereby upon a vibration being transmitted to the damper, the weight may be rotated by the reciprocation of the screw rod.

* * * * *